United States Patent
Abs (10) Patent No.: US 9,355,784 B2
(45) Date of Patent: May 31, 2016

(54) VARIABLE ROTATING CAPACITOR FOR SYNCHROCYCLOTRON

(75) Inventor: Michel Abs, Bossiere (BE)

(73) Assignee: Ion Beam Applications, SA, Louvain-la-Neuve (BE)

(*) Notice: Subject to any disclaimer, the term of this patent is extended or adjusted under 35 U.S.C. 154(b) by 191 days.

(21) Appl. No.: 13/982,252

(22) PCT Filed: Jan. 25, 2012

(86) PCT No.: PCT/EP2012/051081
§ 371 (c)(1),
(2), (4) Date: Dec. 8, 2013

(87) PCT Pub. No.: WO2012/101143
PCT Pub. Date: Aug. 2, 2012

(65) Prior Publication Data
US 2014/0103839 A1    Apr. 17, 2014

Related U.S. Application Data

(60) Provisional application No. 61/437,089, filed on Jan. 28, 2011.

(30) Foreign Application Priority Data

Jan. 28, 2011  (EP) .................................. 11152468

(51) Int. Cl.
| | | |
|---|---|---|
| *H01G 5/40* | (2006.01) | |
| *H01G 5/06* | (2006.01) | |
| *H01G 5/12* | (2006.01) | |
| *H05H 7/02* | (2006.01) | |
| *H05H 13/02* | (2006.01) | |
| *H01G 5/011* | (2006.01) | |

(52) U.S. Cl.
CPC .................. *H01G 5/40* (2013.01); *H01G 5/011* (2013.01); *H01G 5/06* (2013.01); *H01G 5/12* (2013.01); *H05H 7/02* (2013.01); *H05H 13/02* (2013.01)

(58) Field of Classification Search
CPC ....... H05H 13/00; H05H 13/02; H05H 13/04; H05H 13/005; H05H 7/04
USPC .......................................... 315/501, 502, 503
See application file for complete search history.

(56) References Cited

U.S. PATENT DOCUMENTS

| | | |
|---|---|---|
| 2,014,930 A | 9/1935 | Gebhard |
| 2,272,211 A | 2/1942 | Kohler |
| 2,434,917 A | 1/1948 | Fuchs |
| 2009/0140671 A1 | 6/2009 | O'Neal, III |

FOREIGN PATENT DOCUMENTS

| | | |
|---|---|---|
| FR | 2886450 A1 | 12/2006 |
| JP | 8210873 A | 8/1996 |

OTHER PUBLICATIONS

Espacenet English machine translation of FR2886450, Jan. 12, 2006.*

* cited by examiner

*Primary Examiner* — John Poos
(74) *Attorney, Agent, or Firm* — Christopher Casieri (57) ABSTRACT

A variable rotating capacitor or RotCo 5 that can be connected via a transmission line 3 to the dee 2 of a synchrocyclotron 1 so as to adjust a resonant frequency of the synchrocyclotron as a function of time and which comprises a cylindrical rotor 10 and a cylindrical stator 20 that are coaxial with the Z axis. The rotor comprises a plurality of circumferentially-distributed rotor electrodes 11 extending parallel to its rotation axis Z. The stator comprises a plurality of circumferentially-distributed stator electrodes 21 extending parallel to the rotation axis Z. Each stator electrode 21 consists of a single metal plate and all said plates are distributed over one and the same stator circumference 25. This makes it possible for the RF currents in the electrodes to be better distributed and thus reduces the local overheating.
The present invention also relates to a synchrocyclotron comprising such a RotCo.

11 Claims, 9 Drawing Sheets

VARIABLE ROTATING CAPACITOR FOR SYNCHROCYCLOTRON

This application is a 371 application of PCT/EP2012/051081, filed Jan. 25, 2012, which, in turn, claims priority of European Patent Application No.: 11142468.2, filed on Jan. 28, 2011 and U.S. Provisional Application No. 61/437,089 filed Jan. 28, 2011.

FIELD OF THE INVENTION

The present invention relates to the field of RF resonators for synchrocyclotrons and in particular to a variable rotating capacitor or RotCo for modulating the resonant frequency of such a resonator as a function of time.

PRIOR ART

One type of accelerator for accelerating particles to high energy is a cyclotron. A cyclotron accelerates charged particles—for example protons—which move in an axial magnetic field along a spiral path, by applying an alternating radiofrequency voltage (RF voltage) to one or more accelerating electrodes (called "dees") contained in a vacuum chamber. This RF voltage produces an accelerating electric field in the space that separates the dees, thereby enabling the charged particles to be accelerated.

As the particles accelerate, their mass increases due to relativistic effects. When accelerated in a uniform magnetic field, the particles undergo progressive dephasing relative to the radiofrequency accelerating electric field. In practice, two techniques are used to compensate for these relativistic effects: the isochronous cyclotron technique and the synchrocyclotron technique.

An isochronous cyclotron uses an RF voltage of fixed frequency combined with a magnetic field that increases in intensity with the radius of the particle's path, thereby enabling the particles to be suitably accelerated. However, the magnetic structure of such a type of cyclotron has additional complexities in order to ensure that the beam is correctly focused.

Figure 1:
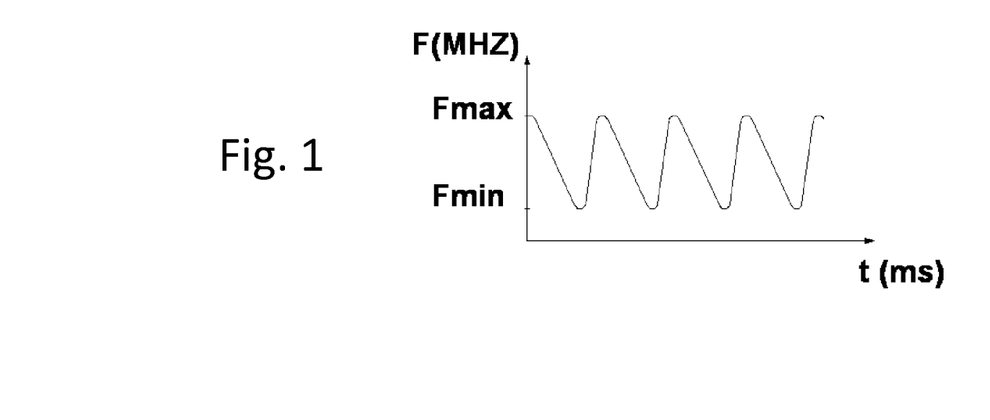
FIG. 1 shows a frequency-time plot for an accelerating electric field in a synchrocyclotron.

In a synchrocyclotron, the intensity of the magnetic field decreases slightly with the radius so as to ensure correct focusing of the beam, and the frequency of the RF voltage is progressively decreased so as to compensate for the gain in relativistic mass of the accelerated particles as the radius of their path increases. In this case, the frequency of the RF voltage must therefore be modulated over time. The frequency must be made to decrease continuously during an acceleration phase, between the capture and the extraction of a bunch of particles, and then must be rapidly increased so as to be capable of accelerating the next bunch, and so on cyclically for each bunch. An example of a frequency-time plot of the RF voltage for a synchrocyclotron is illustrated in FIG. 1.

The RF system of a synchrocyclotron typically comprises an accelerating electrode connected via a transmission line to a variable capacitor. This assembly forms a circuit that resonates at a defined frequency. An equivalent RLC circuit serves to represent the resonant circuit. The resistor R represents the resistive losses and the inductor L represents the transmission line supporting the dee. The fixed capacitor C is formed by the spaces between the structure and ground. To modulate the frequency of the RF voltage, it is known to insert a variable rotating capacitor or RotCo into the RLC circuit. This type of capacitor typically comprises a rotor having rotor electrodes and a stator having stator electrodes. During rotation of the rotor, the rotor electrodes are positioned cyclically facing the stator electrodes, thereby producing a cyclic variation in capacitance as a function of time.

RotCos having radially-extending electrodes have been proposed by K. R. MacKenzie et al. ("Design of the radio-frequency system for the 184-inch cyclotron", Radiation Laboratory, University of Berkeley, UCRL-64) and by R. Schneider et al. ("Nevis synchrocyclotron conversion program RF system", Columbia University, NY, 1971). Such RotCos are also known from the patents GB 655 271 and WO 2009-073480. However, this type of RotCo having radial electrodes does not provide a satisfactory frequency/time curve.

More rarely, RotCos having axially-extending electrodes have been proposed, for example by J. Lefrancois ("A brief history of the Harvard University Cyclotrons", page 23, Richard Wilson, Harvard University Press, 2004).

However, the known RotCos all have the disadvantage of creating localized temperature rises due to a non-homogeneous power density in the electrodes. One object of the present invention is to solve this difficulty, at least in part.

SUMMARY OF THE INVENTION

According to a first aspect, the present invention provides a variable rotating capacitor or RotCo that is adapted to be connected via a transmission line to a dee of a synchrocyclotron and that is adapted to modify a resonant frequency of the synchrocyclotron as a function of time, said RotCo comprising:

a rotor having a rotation axis (Z) and having a plurality of circumferentially-distributed rotor electrodes extending parallel to the rotation axis; and a stator, coaxial with the rotor, and having a plurality of circumferentially-distributed stator electrodes extending parallel to the rotation axis, each rotor electrode being adapted to face at least one stator electrode during rotation of the rotor in order to form a capacitor, each stator electrode consisting of a single metal plate and all the stator electrodes being distributed on the same stator circumference centered on the rotation axis (Z).

When there is a stack of stator electrodes, as is the case in the known RotCos, the currents flowing through the centermost electrodes of the stack add to those in the neighboring electrodes until reaching the outside of the stack, thereby resulting in localized temperature rises.

A RotCo according to the invention allows the RF currents to flow more easily along the rotor electrodes, thus avoiding an imbalance in the power density that appears with a stack and thus reducing local overheating.

Another object of the invention is to provide a RotCo having a capacitance (in farads) which is less sensitive to the mechanical deformations caused by the rotation of the rotor and/or by overheating when the RotCo is in operation.

For this purpose, the rotor preferably comprises a cylindrical cage of axis Z, said cage having a plurality of radially-projecting poles forming said rotor electrodes respectively, each pole having, in cross section, a profile that flares outward toward a corresponding stator electrode.

Such a construction makes the rotor and its electrodes markedly more robust than those of known RotCos and makes it possible to reduce the mechanical deformations that the rotor electrodes would otherwise undergo as a result of the generally rapid rotation (e.g. at 10000 rpm) of the rotor and/or as a result of the thermally induced deformations.

Thus, a RotCo having an instantaneous capacitance (in farads) which is less sensitive to the rotation speed of the rotor and/or to overheating is obtained.

Preferably, each metal plate and a distal face of each pole are curved, each having a radius of curvature centered on the Z axis. This makes it possible for the rotor electrodes to be very close to the stator electrodes, thus increasing the maximum capacitance of the RotCo.

More preferably, a radial distance separating a rotor electrode from a stator electrode is between 1 mm and 5 mm. Such inter-electrode spacings in fact optimize the RotCo in terms of cost and performance.

According to a second aspect, the invention relates to a synchrocyclotron comprising a variable rotating capacitor or RotCo.

These aspects and also other aspects of the invention will be clarified in the detailed description of particular embodiments of the invention.

BRIEF DESCRIPTION OF THE DRAWINGS

The figures are given by way of indication but do not constitute any limitation of the present invention. Moreover, the drawings have not been drawn to scale. Identical or similar components are generally denoted by the same reference numbers in the figures.

DETAILED DESCRIPTION OF PREFERRED EMBODIMENTS

Figure 2:
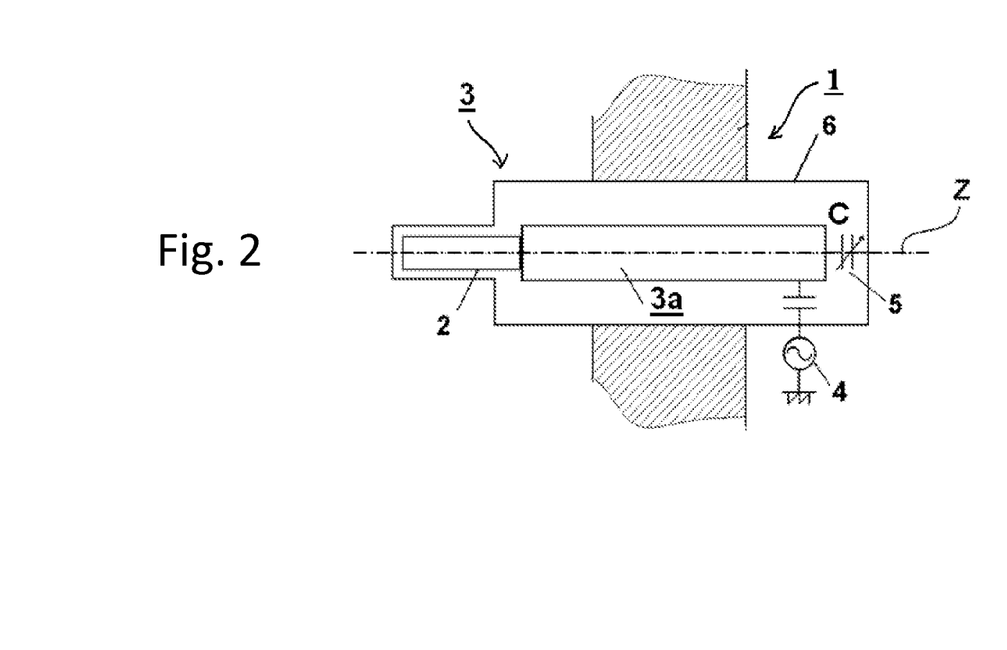
FIG. 2 is a view showing the principle of the RF system of a synchrocyclotron.

As a brief description of the known environment in which a RotCo according to the invention is used, FIG. 2 firstly shows in general a simplified RF structure of a synchrocyclotron 1. This RF structure comprises an accelerating dee 2 connected to an RF generator 4 via a coaxial transmission line 3 at the end of which there is RotCo 5. A conducting enclosure 6, which is grounded, surrounds the whole assembly. Such a structure is well known in the prior art and will therefore not be described in more detail.

Figure 3A:
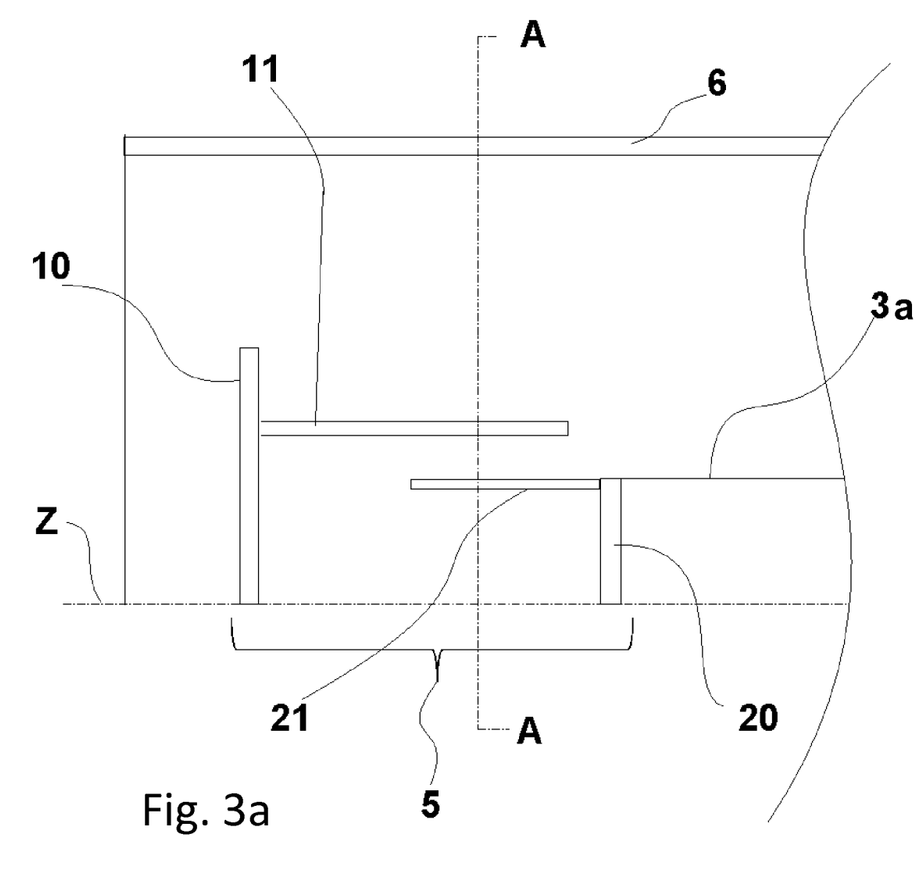
FIGS. 3a and 3b show schematically a longitudinal half-section and a transverse half-section, respectively, of a RotCo according to the invention.
Figure 3B:
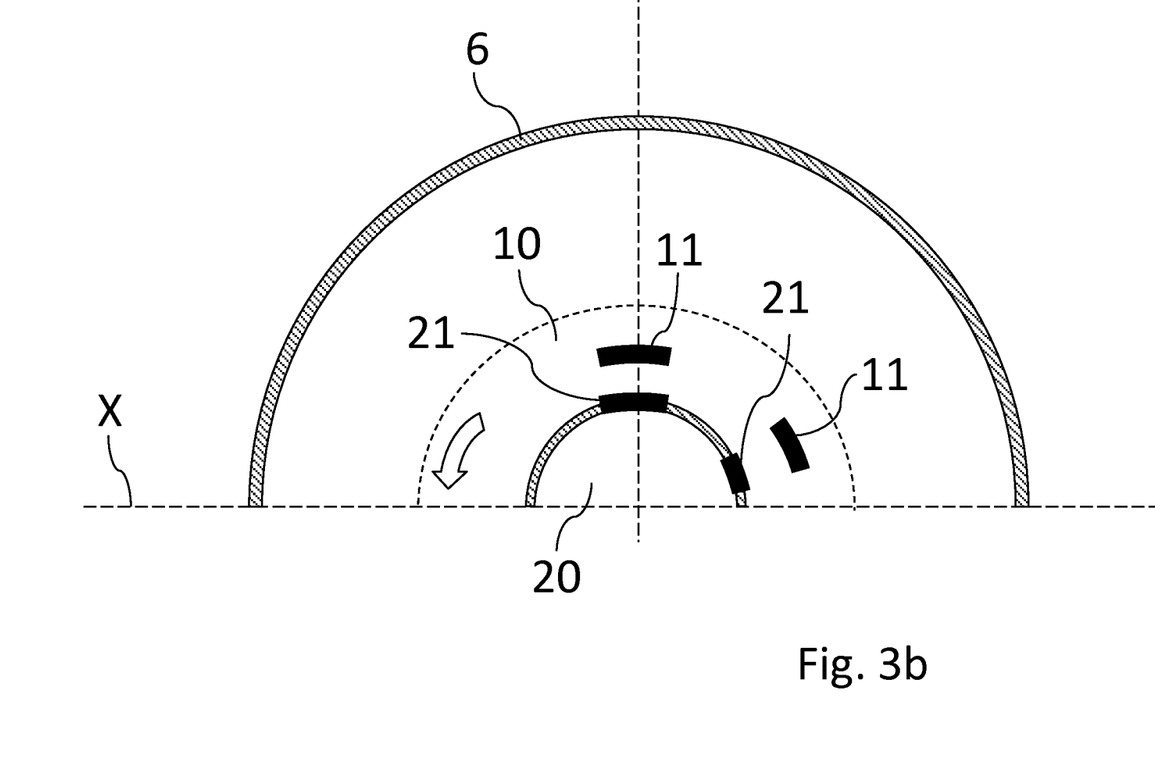

FIGS. 3a and 3b show schematically a longitudinal half-section and a transverse half-section (section "AA") of a RotCo 5 according to the invention. The RotCo comprises a rotor 10 having a rotation axis Z and a stator 20 coaxial with the rotor. In this example, the rotation axis Z is the same as the longitudinal axis of the transmission line 3, but this is not essential. The rotor 10 comprises a plurality of rotor electrodes 11 that are distributed circumferentially, for example on the perimeter of a disk perpendicular to the Z axis and centered on the Z axis, and which extend longitudinally, i.e. along the direction of the Z axis.

The stator 20 comprises a plurality of stator electrodes 21, circumferentially-distributed over one and the same stator circumference 25 and extending longitudinally, i.e. along the direction of the Z axis. Each stator electrode 21 consists of a single metal plate.

Since the radii of two (stator and rotor) circumferences are different, the rotor electrodes will face or partially face a stator electrode cyclically when the rotor is rotated about its axis Z, thus generating an inter-electrode capacitance that will also vary cyclically over the course of time. If for example the rotor is rotated at constant speed, the capacitance developing between the stator and rotor electrodes will for example have the sawtooth shape of the curve in FIG. 1. Because of the shape and position of the electrodes, the electrostatic field that will develop between a stator electrode and a rotor electrode—when these are facing each other—will have a substantially radial direction.

As may be seen in FIG. 3a, the stator electrodes 21 may for example be mounted on the end of the central conductor 3a of the transmission line 3 of the RF system, either directly on the central conductor or via an insert. Alternatively, the stator electrodes 21 will form an integral part of the central conductor 3a.

The rotor 10 may furthermore be connected electrically to the conducting enclosure 6 through gliding contacts (not shown) so that a variable capacitance is obtained between the conducting enclosure and the end of the central conductor 3a.

Figure 4A:
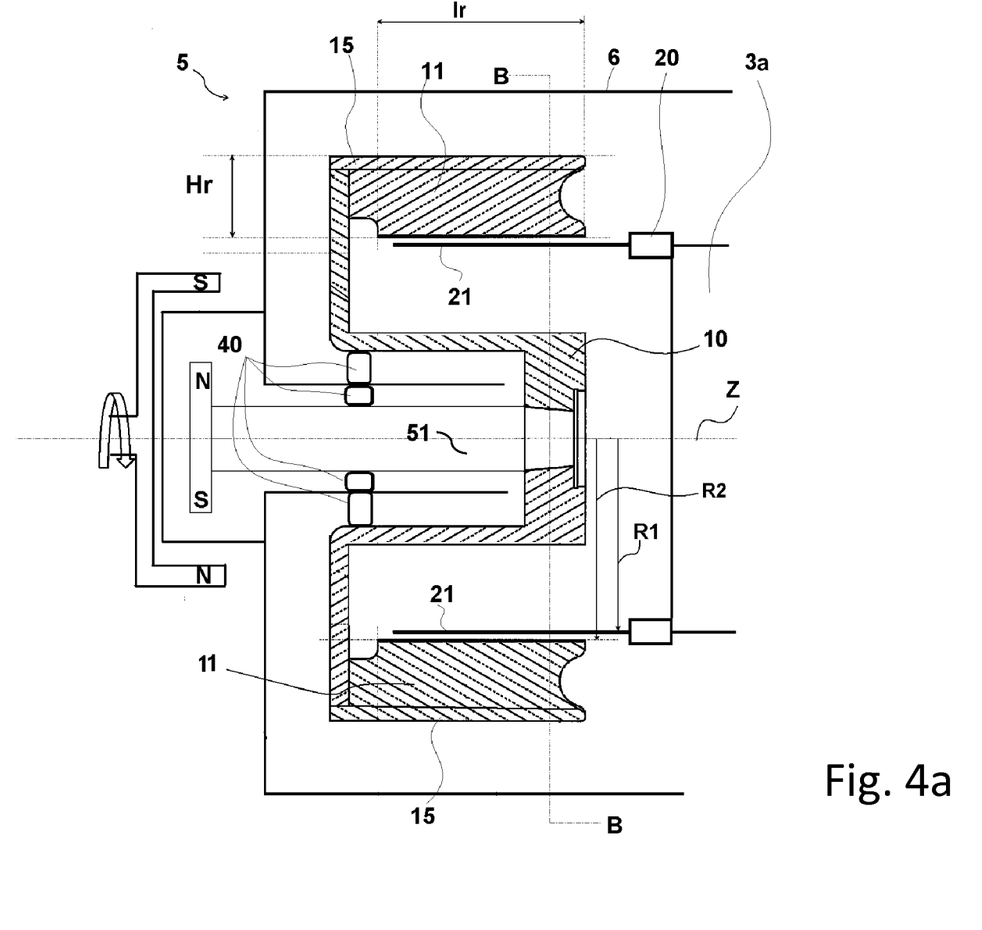
FIGS. 4a and 4b show schematically a longitudinal section and a transverse half-section, respectively, of a RotCo according to a preferred embodiment of the invention.
Figure 4B:
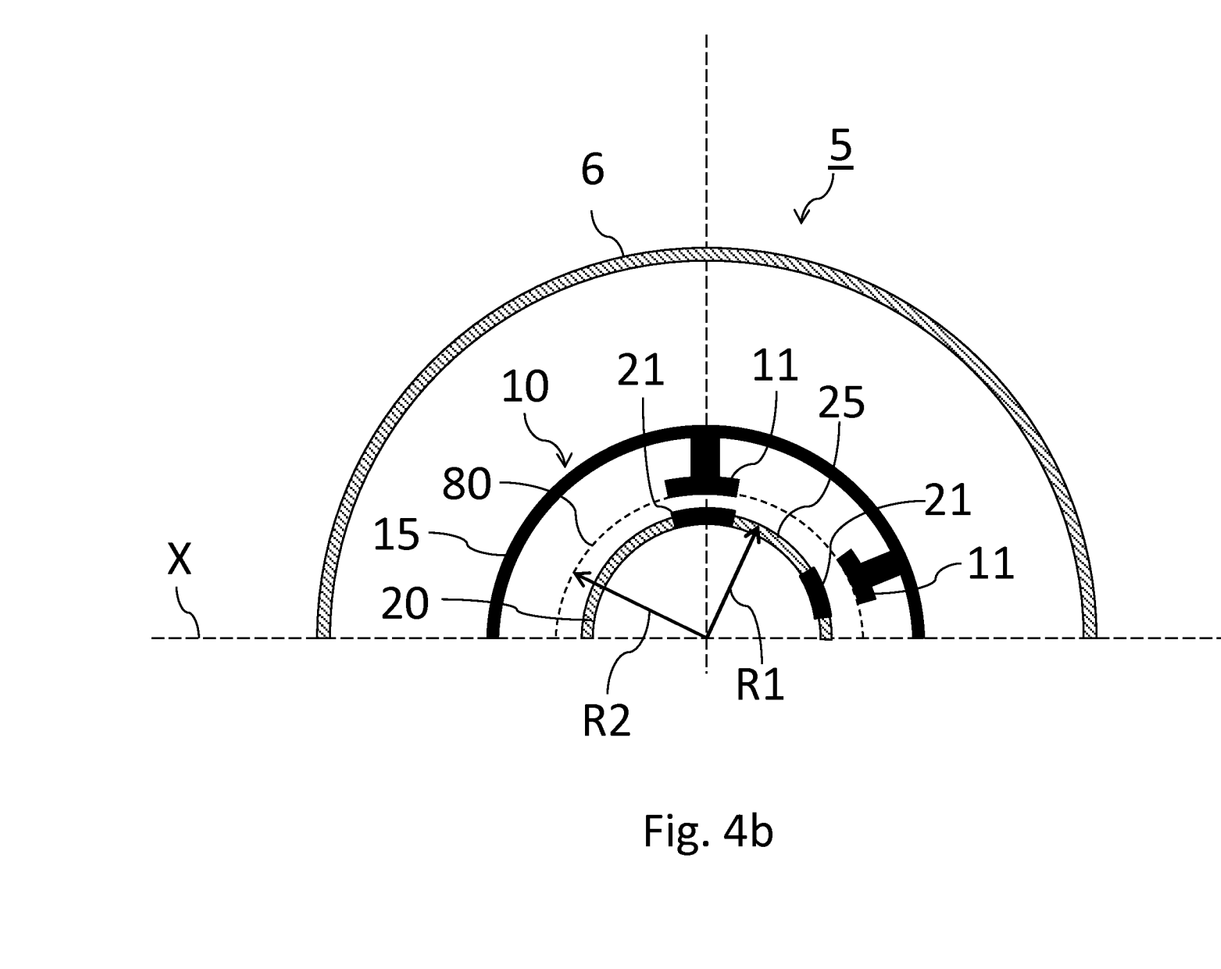

FIGS. 4a and 4b show schematically a longitudinal section and a transverse half-section (section "BB") of a RotCo 5 according to a preferred embodiment of the invention.

The rotor 10 here comprises a cylindrical cage 15 of axis Z presenting a plurality of radially-projecting poles 11 respectively forming said rotor electrodes. As may be seen in FIG. 4b, each pole 11 has in cross section a profile that flares outward toward a corresponding stator electrode 21. In other words, the width of a pole increases on going from an intermediate portion toward a distal end of a pole. The cage 15 itself may for example be made of a composite material such as a fiber-reinforced plastic, whereas the poles of course need to be metallic, or at least their distal face 11a needs to be metallic. In such a case, the metallic parts of all poles are preferably electrically connected together through a conductive link.

Figure 5:
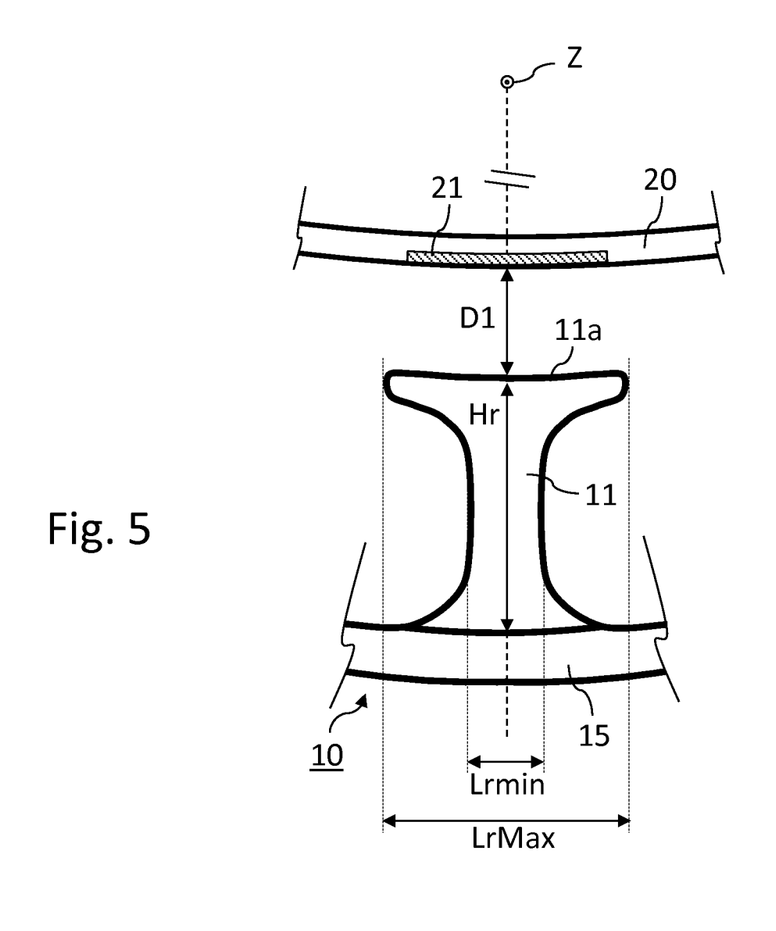
FIG. 5 shows a more detailed view of a pair of electrodes of the RotCo of FIG. 4b.

FIG. 5 shows in greater detail a pair of electrodes of the RotCo of FIG. 4b.

Preferably, each pole 11 of the rotor will have a distal end of width LrMax and an intermediate portion of width Lrmin, such that the ratio Lrmin/LrMax is between 0.1 and 0.6 ($1/10$ and $6/10$). More preferably, the ratio Lrmin/LrMax is between 0.3 and 0.4 ($3/10$ and $4/10$).

Denoting the height of a pole by Hr, each pole will preferably have a ratio Lrmin/Hr between 0.15 and 0.45 ($15/100$ and $45/100$). More preferably, the ratio Lrmin/Hr is between 0.25 and 0.35 ($25/100$ and $35/100$).

Even more preferably, Lrmin is greater than 5 mm in order to achieve sufficient rigidity.

Preferably, each metal plate 21 is curved, having a radius of curvature centered on the Z axis, and a distal face 11a of each pole 11 is also curved, having a radius of curvature also centered on the Z axis, as may be seen in FIG. 5. This arrangement enables the stator and rotor electrodes to be brought very close together, thus increasing the maximum capacitance (in farads) that the RotCo can provide.

However, a minimum spacing must be maintained between the electrodes so as to avoid a breakdown when the RotCo is under voltage and/or to prevent the electrodes from telescoping due to mechanical deformations.

As the RotCo according to the invention is used at very low ambient pressure (quasi-vacuum), the inventors determined that an optimum is obtained when the spacing—that is to say a radial distance D1 separating opposed faces of a rotor electrode 11a and a corresponding stator electrode 21—is between 1 mm and 5 mm, preferably 4 mm.

Preferably, the rotor 10 will be designed in such a way that it has an orthogonal symmetry of order N relative to the rotation axis Z, N being equal to the number of rotor electrodes. This symmetry reduces imbalance when the rotor is being rotated and makes it possible to obtain a capacitance/time characteristic which is appropriate to the function of the RotCo.

More preferably, N will be between 4 and 10. The rotor will thus for example comprise four poles separated from one another by 90 degrees or ten poles separated from one another by 36 degrees. Even more preferably, N will be equal to 8. In this case, the rotor will comprise eight poles separated from one another by 45 degrees. The inventors have in fact found that these values of N provide the best results in terms of performance, cost, weight, stability, etc.

Preferably, at least one of the rotor electrodes 11 has, at its axial end intended to be oriented toward the dee 2, an axial concavity 12, as may be seen in FIG. 4a. This concavity 12 serves to reduce the edge effects between the rotor electrode 11 and a stator electrode 21 when they are facing each other.

Figure 6A:
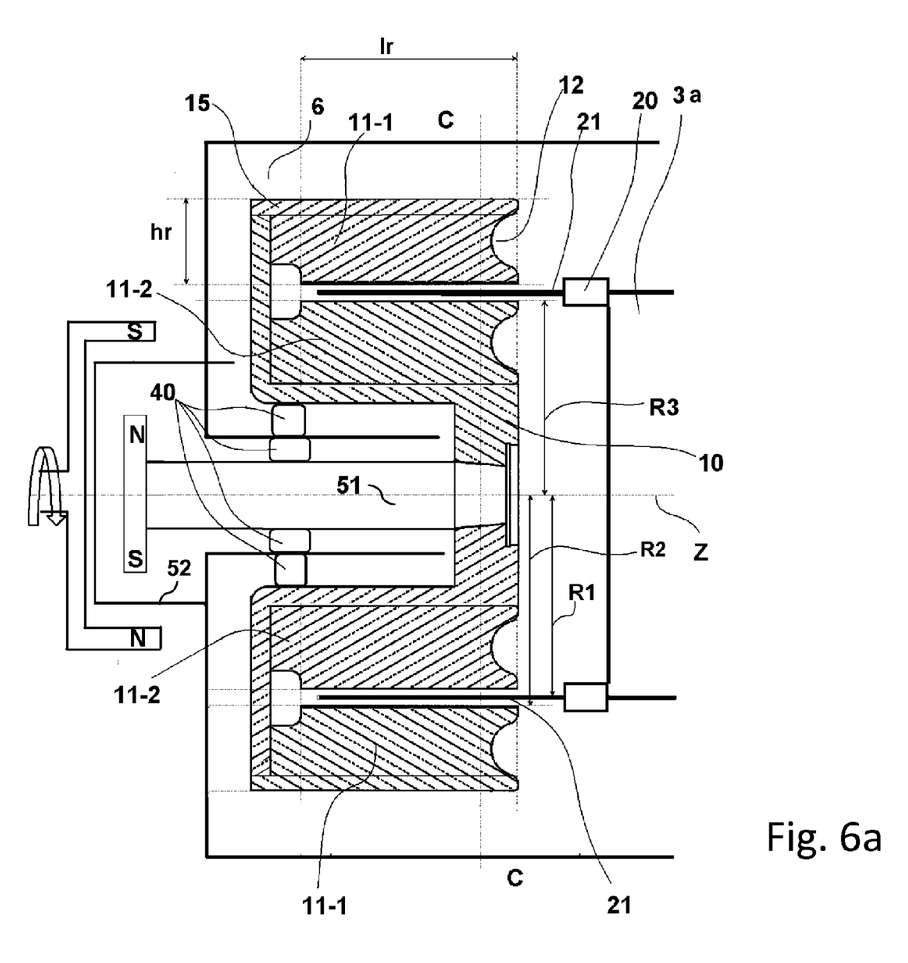
FIGS. 6a and 6b show schematically a longitudinal section and a transverse half-section, respectively, of a RotCo according to an even more preferable embodiment of the invention.
Figure 6B:
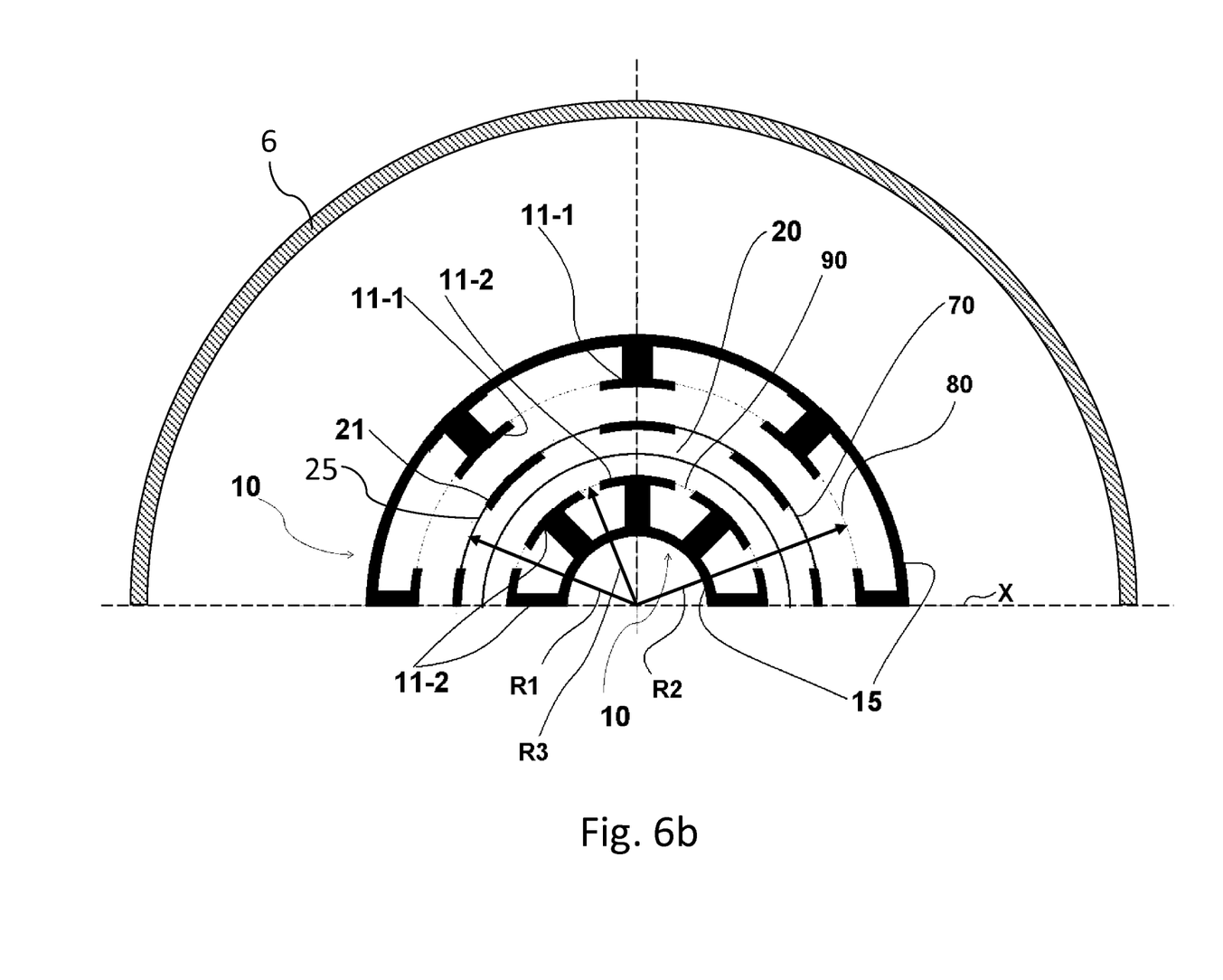

Preferably, the rotor electrodes are divided into two groups, as illustrated in FIGS. 6a and 6b:
 a first group of rotor electrodes 11-1 distributed over a first rotor circumference 80 of radius R2; and
 a second group of rotor electrodes 11-2 distributed over a second rotor circumference 90 of radius R3.

The radii R2 and R3 are chosen in such a way that, if R1 denotes the radius of the stator circumference 25, then:

R2>R1>R3.

Thus, each stator electrode 21 is capable of facing, on one side, the rotor electrodes of the first group 11-1 and, on the other side, the rotor electrodes of the second group 11-2, thereby enabling the maximum capacitance of the RotCo to be increased. This configuration also has the advantage of being less sensitive to any centering errors and/or to deformations of mechanical and/or thermal origin. This is because in the case for example of the rotor expanding radially, the greater separation between a rotor electrode of the first group and a stator electrode will be compensated for by a smaller separation between a rotor electrode of the second group and said stator electrode, thus maintaining a more constant total capacitance than if the second group of electrodes were absent.

The first group 11-1 and the second group 11-2 of rotor electrodes are mechanically and electrically connected together and thus form a single electromechanical assembly that can be driven by the same motor. There are several means for making this connection. One way is to arrange the electrodes of the two groups (11-1 and 11-2) over two coaxial cylinders respectively and to connect these two cylinders together via their axial ends, for example by means of a full disk centered on the rotation axis Z of the rotor. A shaft 51 mounted at the centre of the disk and supported by ball bearings 40 makes it possible for a motor to be connected thereto in order to drive the rotor.

A preferred means for connecting the two cylinders is to connect the axial ends of the two cylinders via a ring, the outside diameter of which corresponds to the diameter of the outer cylinder (the one comprising the first group of rotor electrodes 11-1) and the inside diameter of which corresponds to the diameter of the inner cylinder (the one comprising the second group of rotor electrodes 11-2), and to close the inner cylinder at an opposite axial end by means of a disk. Thus, a longitudinal cross section of the rotor 10 has substantially the shape of a "W" and the stator electrodes 11 are capable of being inserted between an external leg and an internal leg of the "W" when the rotor is rotating.

Such a preferred configuration is illustrated in FIGS. 6a and 6b. In particular, FIG. 6a shows the longitudinal section of the rotor, which has the form of a "W" lying down on its side, the legs of the "W" being mutually parallel. This configuration has the advantage of creating an accessible recess within the inner cylinder, thereby making it possible for example to house therein a motor for driving the rotor. A more compact assembly is thus obtained.

Preferably, the first group 11-1 of rotor electrodes comprises the same number of electrodes as the second group 11-2 of rotor electrodes, and the electrodes of the first group 11-1 are respectively arranged facing the electrodes of the second group 11-2, as shown in FIG. 6b.

Figure 7:
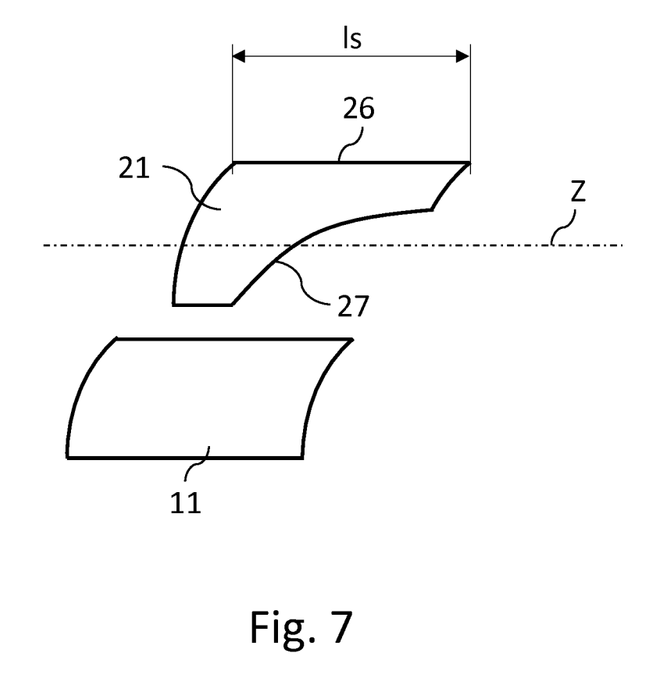
FIG. 7 shows schematically a perspective view of an example of a preferred stator electrode of a RotCo according to the invention.

FIG. 7 shows schematically a perspective view of an example of a preferred stator electrode 21 of a RotCo according to the invention. The stator electrode is a metal plate having a straight first flank 26 parallel to the rotation axis Z and a second flank 27 having a profile that varies in such a way that the distance between the first flank and the second flank decreases along the direction of the rotation axis Z and over at least part of the length (ls) of the plate.

Such a profile enables the capacitance to be progressively increased and then rapidly decreased, so as to provide a frequency-time profile of the RF voltage as shown in FIG. 1 (i.e. a progressive decrease in frequency followed by a rapid increase). FIG. 7 also shows a corresponding rotor electrode 11 and the direction in which it rotates with respect to the stator electrode 21.

In a concrete example of a synchrocyclotron in which particle capture takes place at 85 MHz and particle extraction at 64 MHz, the RF frequency has to vary between 90 MHz and 60 MHz respectively. For this purpose, the capacitance of the RotCo must vary cyclically, preferably between 50 pF and 230 pF respectively.

The design of the RotCo may for example be based on the simple model of a planar capacitor, consisting of two planar electrodes separated by a dielectric. The capacitance C (in farads) is then given by the following equation:

$$C = \frac{\varepsilon \cdot S}{d}$$

in which $\varepsilon$ is the dielectric permittivity, S is the area (in m$^2$) of the smaller of the electrodes and d is the thickness (in m) of the dielectric.

The above specifications may be obtained by providing for example an 8-pole rotor, each pole having a distal width of about 25 mm and extending over a length of 100 mm in the axial direction Z.

To generate a periodic RF electric field capable of accelerating for example about 1000 charged particle bunches per second, such rotor has to be rotated at 7500 rpm.

It is to be noted that, in a Rotco according to the invention (whatever the embodiment), the stator electrodes and the rotor electrodes are preferably exclusively separated from each other by a vacuum (or a quasi vacuum). In other words, there is preferably no solid dielectric material between a stator electrode and a rotor electrode of a Rotco according to the invention. This allows to rotate the rotor at high speed (over 1000 RPM), with electrodes positioned very close to each other (e.g.: spacing D1 is between 1 mm and 5 mm).

According to a second aspect, the invention provides a synchrocyclotron 1 comprising an RF system 2, 3, 4 for accelerating charged particles in the synchrocyclotron, said RF system comprising a RotCo 5 as described above.

In a synchrocyclotron, the inside of the conducting enclosure 6 comprising the rotor 10 and the stator 20 is generally under a vacuum. To be able to drive said rotor 10 by means of a motor, at least part of which is external to the conducting enclosure 6, that is to say to be able to place at least part of said motor under atmospheric pressure, the inventors have also preferably provided a magnetic coupling between the motor and the rotor 10.

Several types of magnetic coupling are possible.

One example of magnetic coupling is illustrated in FIG. 4a and in FIG. 6a. In this example, the rotor 10 comprises a shaft 51 provided with a permanent magnet N/S at its distal end. Said magnet and said shaft are covered by a hermetically sealed end cover 52, thus making it possible to maintain the vacuum inside the conducting enclosure. Placed around said cover is a cylindrical structure comprising peripheral permanent magnets S/N, said structure being capable of being rotated by said motor (not illustrated).

In another example of magnetic coupling (not illustrated), said cylindrical structure comprises electromagnets supplied with alternating electrical current capable of creating a rotating magnetic field suitable for rotating said permanent magnet N/S (and therefore the shaft 51). In other words, this is a synchronous electric motor having permanent magnets, the stator of which is external to the cover 52, and the rotor 51 of which is internal to the cover 52.

One important parameter not to be neglected is the operating environment. Specifically, the magnetic leakage field created by the main magnetic field of the synchrocyclotron around the RotCo may be very high, for example around 500 gauss. To minimize eddy current losses, in particular in the rotor 10, it is preferred to place a magnetic shield around the conducting enclosure 6 at the RotCo, for example a shield consisting of a sandwich of soft iron plates. This shield also serves to dissipate the heat, arising from the eddy currents and the RF losses, to the external environment.

The present invention has been described in relation to specific embodiments that are of purely illustrative value and must not be considered as limiting. In general, it would be obvious to a person skilled in the art that the present invention is not limited to the examples illustrated and/or described above. The invention comprises each of the novel features, and also a combination thereof. The presence of reference numbers in the drawings cannot be considered to be limiting, including when these numbers are indicated in the claims.

The use of the verbs "comprise" and "include", or any other variant, and also the conjugation thereof, cannot in any way exclude the presence of elements other than those mentioned. The use of the indefinite article "a" or "an" or the definite article "the" when introducing an element does not exclude the presence of a plurality of these elements.

To summarize, the invention may also be described as follows: a variable rotating capacitor or RotCo 5 that can be connected via a transmission line 3 to the dee 2 of a synchrocyclotron 1 so as to adjust a resonant frequency of the synchrocyclotron as a function of time and which comprises a cylindrical rotor 10 and a cylindrical stator 20 that are coaxial with the Z axis. The rotor comprises a plurality of circumferentially-distributed rotor electrodes 11 extending parallel to its rotation axis Z. The stator comprises a plurality of circumferentially-distributed stator electrodes 21 extending parallel to the rotation axis Z. Each stator electrode 21 consists of a single metal plate and all said plates are distributed over one and the same stator circumference 25. The invention also relates to a synchrocyclotron comprising such a RotCo.

The invention claimed is:

1. A synchrocyclotron (1) comprising an RF system (2,3,4) for accelerating charged particles in the synchrocyclotron, said RF system comprising a transmission line (3), a dee (2) and a variable rotating capacitor or RotCo (5), wherein the RotCo (5) is adapted to be connected via the transmission line (3) to the dee (2) of the synchrocyclotron (1) and is adapted to modify a resonant frequency of the synchrocyclotron as a function of time, said RotCo comprising:
   a rotor (10) having a rotation axis (Z) and having a plurality of circumferentially-distributed rotor electrodes (11) extending parallel to the rotation axis (Z), and the rotor (10) comprises a cylindrical cage (15) of axis Z, said cage (15) having a plurality of radially-projecting poles (11) forming said rotor electrodes respectively, each pole (11) having, in cross section, a profile that flares outward toward a corresponding stator electrode (21); and
   a stator (20), coaxial with the rotor (10), and having a plurality of circumferentially-distributed stator electrodes (21) extending parallel to the rotation axis (Z),
   each rotor electrode (11) being adapted to face at least one stator electrode (21) during rotation of the rotor (10) in order to form a capacitor, wherein each stator electrode (21) consists of a single metal plate (21) and wherein all the stator electrodes (21) are distributed on a same stator circumference (25) centered on the rotation axis (Z),
   each metal plate (21) and a distal face (11a) of each pole (11) are curved, each having a radius of curvature centered on the Z axis,
   and a radial distance (D1) separating a rotor electrode (11a) from a stator electrode (21) is between 1 mm and 5 mm.

2. The synchrocyclotron 1 as claimed in claim 1, wherein the rotor 10 has an orthogonal symmetry of order N relative to the rotation axis (Z), N being equal to the number of rotor electrodes.

3. The synchrocyclotron 1 as claimed in claim 2, wherein N is between 4 and 10.

4. The synchrocyclotron 1 as claimed in claim 3, wherein N is equal to 8.

5. The synchrocyclotron 1 as claimed in claim 1, wherein at least one of the rotor electrodes (11) has, at its axial end, an axial concavity (12).

6. A synchrocyclotron 1 comprising an RF system (2,3,4) for accelerating charged particles in the synchrocyclotron, said RF system comprising a transmission line (3), a dee (2) and a variable rotating capacitor or RotCo (5), wherein the RotCo (5) is adapted to be connected via the transmission line (3) to the dee (2) of the synchrocyclotron (1) and is adapted to modify a resonant frequency of the synchrocyclotron as a function of time, said RotCo comprising:
   a rotor (10) having a rotation axis (Z) and having a plurality of circumferentially-distributed rotor electrodes (11) extending parallel to the rotation axis (Z); and
   a stator (20), coaxial with the rotor (10), and having a plurality of circumferentially-distributed stator electrodes (21) extended parallel to the rotation axis (Z),
   each rotor electrode (11) being adapted to face at least one stator electrode (21) during rotation of the rotor (10) in order to form a capacitor, wherein each stator electrode (21) consists of a single metal plate (21) and wherein all the stator electrodes (21) are distributed on a same stator circumference (25) centered on the rotation axis (Z), wherein the rotor electrodes comprise a first group of rotor electrodes (11-1) distributed over a first rotor circumference (80) and a second group of rotor electrodes (11-2) distributed over a second rotor circumference (90), wherein a radius (R1) of the stator circumference (25) is between a radius (R2) of the first rotor circumference (80) and a radius (R3) of the second rotor circumference (90), wherein the first group of rotor electrodes (11-1) comprises the same number of electrodes as the second group of rotor electrodes (11-2), wherein the electrodes of the first group (11-1) are arranged opposite the electrodes of the second group (11-2) respectively and wherein the first and second groups of rotor electrodes form a single electromechanical assembly.

7. The synchrocyclotron 1 as claimed in claim 6, wherein the first group of rotor electrodes (11-1) comprises eight electrodes spaced apart by 45 degrees.

8. The synchrocyclotron 1 as claimed in claims 6 or 7, wherein a longitudinal cross section of the rotor (10) has substantially the shape of a "W" and wherein the stator electrodes (21) are capable of being inserted between an external leg and an internal leg of the "W" when the rotor (10) is rotating.

9. A synchrocyclotron 1 comprising an RF system (2,3,4) for accelerating charged particles in the synchrocyclotron, said RF system comprising a transmission line (3), a dee (2) and a variable rotating capacitor or RotCo (5), wherein the RotCo (5) is adapted to be connected via the transmission line (3) to the dee (2) of the synchrocyclotron (1) and is adapted to modify a resonant frequency of the synchrocyclotron as a function of time, said RotCo comprising:

a rotor (10) having a rotation axis (Z) and having a plurality of circumferentially-distributed rotor electrodes (11) extending parallel to the rotation axis (Z); and a stator (20), coaxial with the rotor (10), and having a plurality of circumferentially-distributed stator electrodes (21) extending parallel to the rotation axis (Z), each rotor electrode (11) being adapted to face at least one stator electrode (21) during rotation of the rotor (10) in order to form a capacitor, wherein each stator electrode (21) consists of a single metal plate (21) and wherein all the stator electrodes (21) are distributed on a same stator circumference (25) centered on the rotation axis (Z), wherein each stator electrode (21) has a straight first flank (26) parallel to the rotation axis (Z) and a second flank (27) having a profile that varies such that the distance between the first flank and the second flank decreases along the direction of the rotation axis (Z) and over at least part of the length of said stator electrode (21).

10. The synchrocyclotron 1 as claimed in claim 6, wherein at least one of the rotor electrodes (11) has, at its axial end, an axial concavity (12).

11. The synchrocyclotron 1 as claimed in claim 6, wherein each stator electrode (21) has a straight first flank (26) parallel to the rotation axis (Z) and a second flank (27) having a profile that varies such that the distance between the first flank and the second flank decreases along the direction of the rotation axis (Z) and over at least part of the length of said stator electrode (21).

* * * * *